US009919756B2

(12) United States Patent
Komatsu et al.

(10) Patent No.: US 9,919,756 B2
(45) Date of Patent: Mar. 20, 2018

(54) SADDLE-RIDE TYPE VEHICLE

(71) Applicant: HONDA MOTOR CO., LTD., Tokyo (JP)

(72) Inventors: Akihiro Komatsu, Wako (JP); Kanya Takigawa, Wako (JP); Satoshi Seo, Wako (JP); Gen Tanabe, Wako (JP); Maurizio Carbonara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/941,283

(22) Filed: Nov. 13, 2015

(65) Prior Publication Data

US 2016/0244116 A1    Aug. 25, 2016

(30) Foreign Application Priority Data

Sep. 30, 2014  (JP) ................. 2014-201537

(51) Int. Cl.
| *B62J 17/00* | (2006.01) |
| *B62J 17/02* | (2006.01) |
| *B62K 11/04* | (2006.01) |
| *B62J 23/00* | (2006.01) |
| *B60K 11/04* | (2006.01) |
| *B60K 13/04* | (2006.01) |
| *B62M 7/02* | (2006.01) |

(52) U.S. Cl.
CPC ............... *B62J 17/00* (2013.01); *B62J 17/02* (2013.01); *B62J 23/00* (2013.01); *B62K 11/04* (2013.01); *B60K 11/04* (2013.01); *B60K 13/04* (2013.01); *B62M 7/02* (2013.01)

(58) Field of Classification Search
CPC ........ B60K 11/04; B60K 13/04; B62K 11/04; B62J 17/00; B62J 17/02; B62J 23/00; B62M 7/02
USPC ......................................................... 180/225
See application file for complete search history.

(56) References Cited

U.S. PATENT DOCUMENTS

| 4,830,135 A * | 5/1989 | Yamashita | ............. B60K 11/08 |
| | | | 123/41.7 |
| 7,556,115 B2 * | 7/2009 | Iwanaga | ................... B62J 99/00 |
| | | | 180/219 |

(Continued)

FOREIGN PATENT DOCUMENTS

JP        7-242188 A      9/1995

*Primary Examiner* — Jacob D Knutson
*Assistant Examiner* — Felicia L. Brittman
(74) *Attorney, Agent, or Firm* — Birch, Stewart, Kolasch & Birch, LLP

(57) ABSTRACT

A saddle-ride type vehicle in which an engine is supported on a body frame and radiators are disposed forward of the engine is provided, wherein waste heat of the radiators is prevented from reaching the engine. The saddle-ride type vehicle includes a radiator shroud 71 that covers a range from a lateral side of a radiator 61 to a lateral side of a cylinder head 42a of the engine E. The radiator shroud 71 has an exhaust port 75 opening outward in a vehicle width direction. The saddle-ride type vehicle also includes a partition wall 82A between the radiator and the cylinder head 42a. The partition wall 82A separates a rear space 61d of the radiator 61 and the cylinder head 42a from each other and brings the rear space 61d into communication with the exhaust port 75 of the radiator shroud 71.

20 Claims, 12 Drawing Sheets

(56) References Cited

U.S. PATENT DOCUMENTS

| | | | | |
|---|---|---|---|---|
| 7,987,938 B2* | 8/2011 | Morita | ............... | B60K 11/04 |
| | | | | 180/229 |
| 8,899,653 B2* | 12/2014 | Usa | ............... | B62J 17/02 |
| | | | | 296/78.1 |
| 2014/0202782 A1* | 7/2014 | Tsukui | ............... | B60K 11/08 |
| | | | | 180/68.1 |
| 2014/0291052 A1* | 10/2014 | Kaita | ............... | B60K 11/08 |
| | | | | 180/229 |

* cited by examiner

SADDLE-RIDE TYPE VEHICLE

CROSS-REFERENCE TO RELATED APPLICATIONS

The present application claims priority under 35 U.S.C. § 119(a) to Japanese Patent Application No. 2014-201537, filed on Sep. 30, 2014, the entire contents of which are hereby incorporated by reference.

BACKGROUND OF THE PRESENT INVENTION

1. Field of the Invention

The present invention relates to a saddle-ride type vehicle.

2. Description of Background Art

In the past, there has been disclosed a structure of a saddle-ride type vehicle in which an engine is supported on a body frame and radiators are disposed forward of the engine. Each of the radiators is laterally covered with a shroud, and an exhaust port for guiding travelling air passing through the radiator to the outside of the shroud is provided in a rear portion of the shroud. As an example only, JP 7-242188-A discloses such a saddle-ride type vehicle.

SUMMARY OF THE INVENTION

However, in the above-described known structure, there is a problem in that, since the shroud covers a range from the lateral side of the radiator to the lateral side of a cylinder head of the engine, part of the travelling air heated by waste heat of the radiator impinges on the cylinder head without being discharged from the exhaust port.

Accordingly, an object of the present invention is to provide a saddle-ride type vehicle in which an engine is supported on a body frame and radiators are disposed forward of the engine, wherein waste heat of the radiators is prevented from reaching the engine.

As a solution to the above-described problem, a first aspect of the present invention is a saddle-ride type vehicle (1) in which an engine (E) is supported on a body frame (10) and radiators (61) are disposed forward of the engine (E), the saddle-ride type vehicle (1) including a radiator shroud (71) that covers a range from a lateral side of each of the radiators (61) to a lateral side of a cylinder head (42a) of the engine (E). The radiator shroud (71) has an exhaust port (75) opening outward in a vehicle width direction. The saddle-ride type vehicle also includes a partition wall (82A) between the radiator (61) and the cylinder head (42a), the partition wall (82A) separating a rear space (61d) of the radiator (61) and the cylinder head (42a) from each other and bringing the rear space (61d) into communication with the exhaust port (75) of the radiator shroud (71).

It should be noted that examples of the saddle-ride type vehicle include general vehicles in which a rider sits astride a vehicle body, and include not only motorcycles (including motor-assisted bicycles and scooter-type vehicles), but also three-wheeled vehicles (including vehicles having one wheel in front and two in the rear, as well as vehicles having two wheels in front and one in the rear) or four-wheeled vehicles.

According to a second aspect of the present invention, that the saddle-ride type vehicle further includes a radiator fan (61e) on a rear surface of the radiator (61), the downstream side thereof being inclined outward in the vehicle width direction, wherein the partition wall (82A) extends in the vehicle width direction at the rear of the radiator fan (61e).

According to a third aspect of the present invention, the saddle-ride type vehicle further includes a fuel tank (25) above the engine (E), wherein a rear portion of the fuel tank (25) is formed with knee grip portions (58d), and wherein a front portion of the fuel tank (25) is formed with bulge portions (58e), the bulge portions (58e) bulging outward in the vehicle width direction, and the radiator shroud (71) is provided with a pad portion (81), the pad portion (81) being disposed forward of the bulge portion (58e) and protruding more outward in the vehicle width direction than the bulge portion (58e).

According to a further aspect of the present invention, the saddle-ride type vehicle further includes a front cowl (29) at a front portion of the vehicle body, wherein the radiator shroud (71) has a front shroud (73) that extends laterally of the radiator (61) from a side portion of the front cowl (29), and a rear shroud (74) that is coupled to the rear of the front shroud (73). The rear shroud (74) has an upper portion (74a) and a lower portion (74b), the upper and lower portions (74a, 74b) being coupled to the front shroud (73), the exhaust port (75) being formed between the upper and lower portions (74a, 74b).

According to a fifth aspect of the present invention, the rear shroud (74) forms openings (78, 79) around the exhaust port (75), the openings (78, 79) being surrounded by vertical walls (76a, 77a) extending vertically and horizontal walls (76b, 77b) extending longitudinally. A water pipe (65) of the radiator (61) is covered with at least the vertical walls (76a, 77a) or the horizontal walls (76b, 77b).

According to the first aspect of the present invention, waste heat of the radiator is prevented from reaching the cylinder head and can be discharged to the outside in the vehicle width direction through the exhaust port of the radiator shroud. Furthermore, the discharge of air from the radiator shroud to the outside in the vehicle width direction can also make the waste heat of the radiator less likely to reach an occupant.

According to the second aspect of the present invention, the waste heat reaching the rear of the radiator is guided to the outside in the vehicle width direction by the partition wall, and can be forcibly discharged to the outside in the vehicle width direction by the radiator fan.

According to the third aspect of the present invention, with the bulge portions located forward of the knee grip portions, it is possible to form the knee grip portions, which are comfortable to touch, while suppressing the exposure of occupant's legs to wind, and to increase the capacity of the fuel tank. Furthermore, with the pad portion of the radiator shroud, it is possible to suppress scratches on the fuel tank.

According to the fourth aspect of the present invention, the upper portion and the lower portion of the rear shroud securely couple the front and rear shrouds and can efficiently form the exhaust port between the upper and lower coupling portions of both shrouds.

According to the fifth aspect of the present invention, it is possible to easily discharge the air in the radiator shroud while concealing the water pipe of the radiator with the rear shroud.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
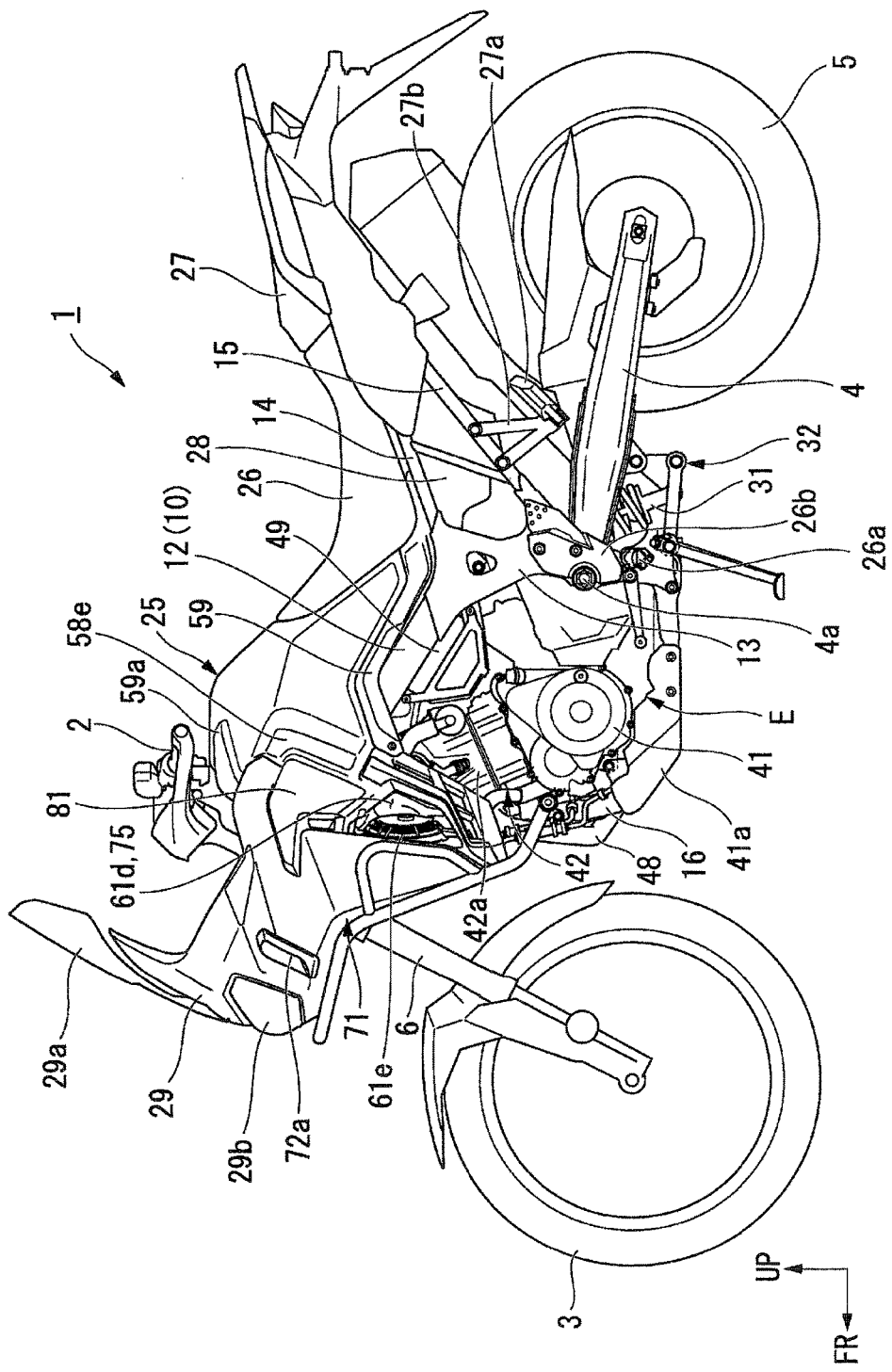
FIG. 1 is a left side view of a motorcycle according to an embodiment of the present invention.

Hereinafter, an embodiment of the present invention will be described with reference to the accompanying drawings. It is to be noted that, in the following description, references to directions, such as front, rear, left, and right, are made with reference to a vehicle to be described below, unless otherwise stated. It is also to be noted that, in the drawings used in the following description, arrow FR indicating the front of the vehicle, arrow LH indicating the left of the vehicle, and arrow UP indicating the upper side of the vehicle are shown in position. It is also to be noted that the vehicle to be described below is of symmetrical configuration with respect to the vehicle body left-right centerline CL shown in position in the drawings, unless otherwise stated.

As shown in FIG. 1, a motorcycle 1 according to this embodiment is equipped with an engine E fixed to a body frame 10 between a front wheel 3 steered by a steering handlebar 2 and a rear wheel 5 supported at a rear end of a swing arm 4.

Figure 7:
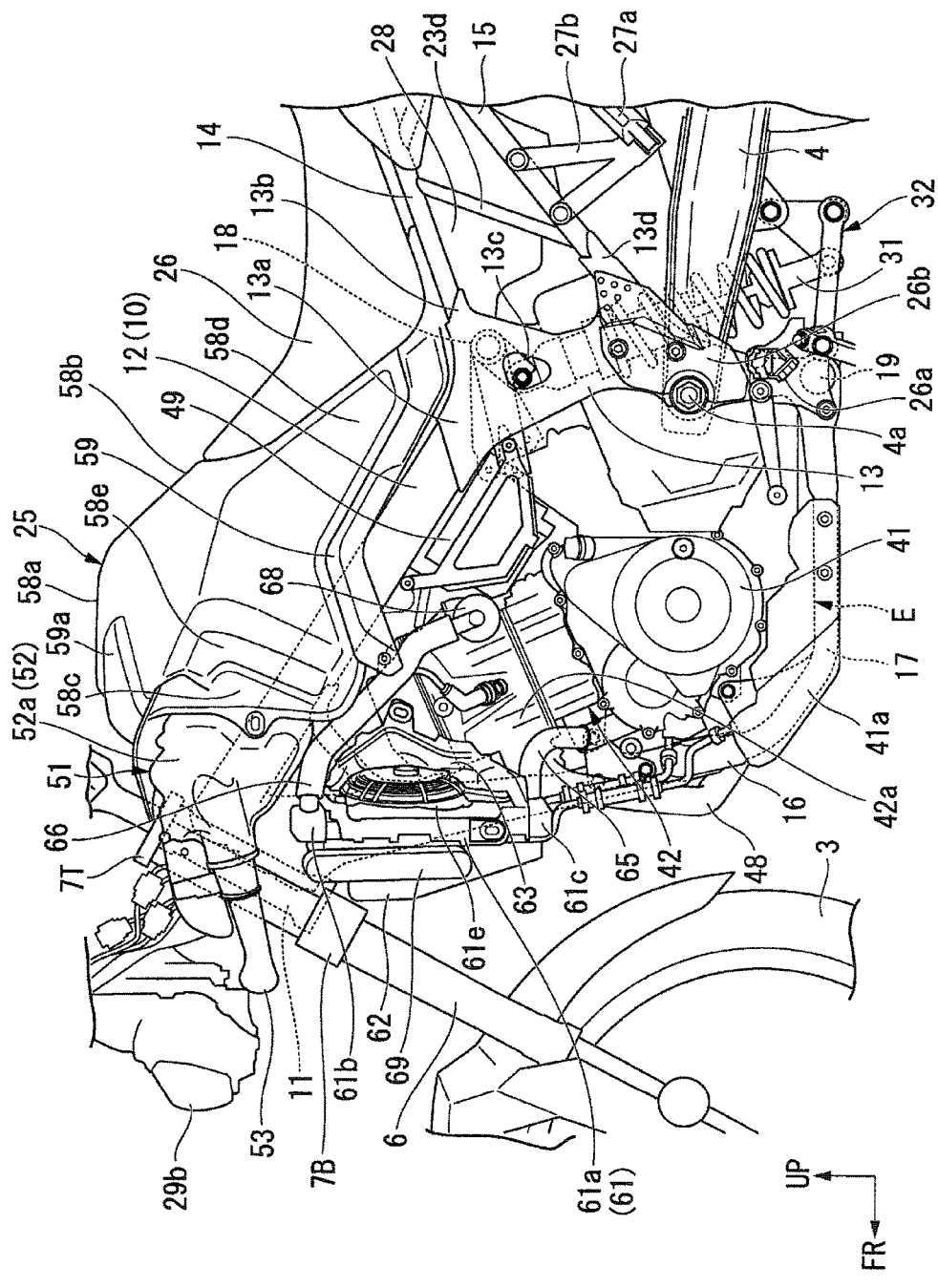
FIG. 7 is a left side view without the radiator shroud.

Referring additionally to FIG. 7, a front-wheel suspension system including the steering handlebar 2 is steerably pivotally supported by a head pipe 11 located at a front end of the body frame 10. A rear-wheel suspension system including the swing arm 4 is swingably pivotally supported by left and right pivot frames 13 located at a longitudinal intermediate portion of the body frame 10. The motorcycle 1 is an off-road vehicle having a large amount of wheel vertical stroke.

A fuel tank 25 is disposed above the engine E. A rider seat 26 is disposed at the rear of the fuel tank 25, and a pillion passenger seat 27 is disposed at the rear of the rider seat 26. A front cowl 29 is mounted in the front of the vehicle body so as to cover the range from the front to the left and right sides of the head pipe 11. An upwardly-extending windshield 29a is mounted on an upper portion of the front cowl 29. A headlight 29b having two left and right lamps is disposed inside a front end of the front cowl 29. The front-wheel suspension system is provided with: left and right front forks 6 with the front wheel 3 journaled to lower ends thereof; a top bridge 7T and a bottom bridge 7B that are provided so as to extend between upper portions of the left and right front forks 6; a steering shaft (not shown) that is provided so as to extend between the top bridge 7T and the bottom bridge 7B, and inserted into the head pipe 11; and the steering handlebar 2 that is supported on the top bridge 7T.

The rear-wheel steering system is provided with: the swing arm 4 with the rear wheel 5 journaled to rear ends of left and right arms thereof; a linkage mechanism 32 that extends between a front portion of the swing arm 4 and lower portions of the left and right pivot frames 13; and a rear cushion 31 that extends between the linkage mechanism 32 and upper portions of the left and right pivot frames 13. A front end of the swing arm 4 is supported by vertical intermediate portions of the left and right pivot frames 13 with a pivot shaft 4a therebetween.

Body Frame

Figure 2:
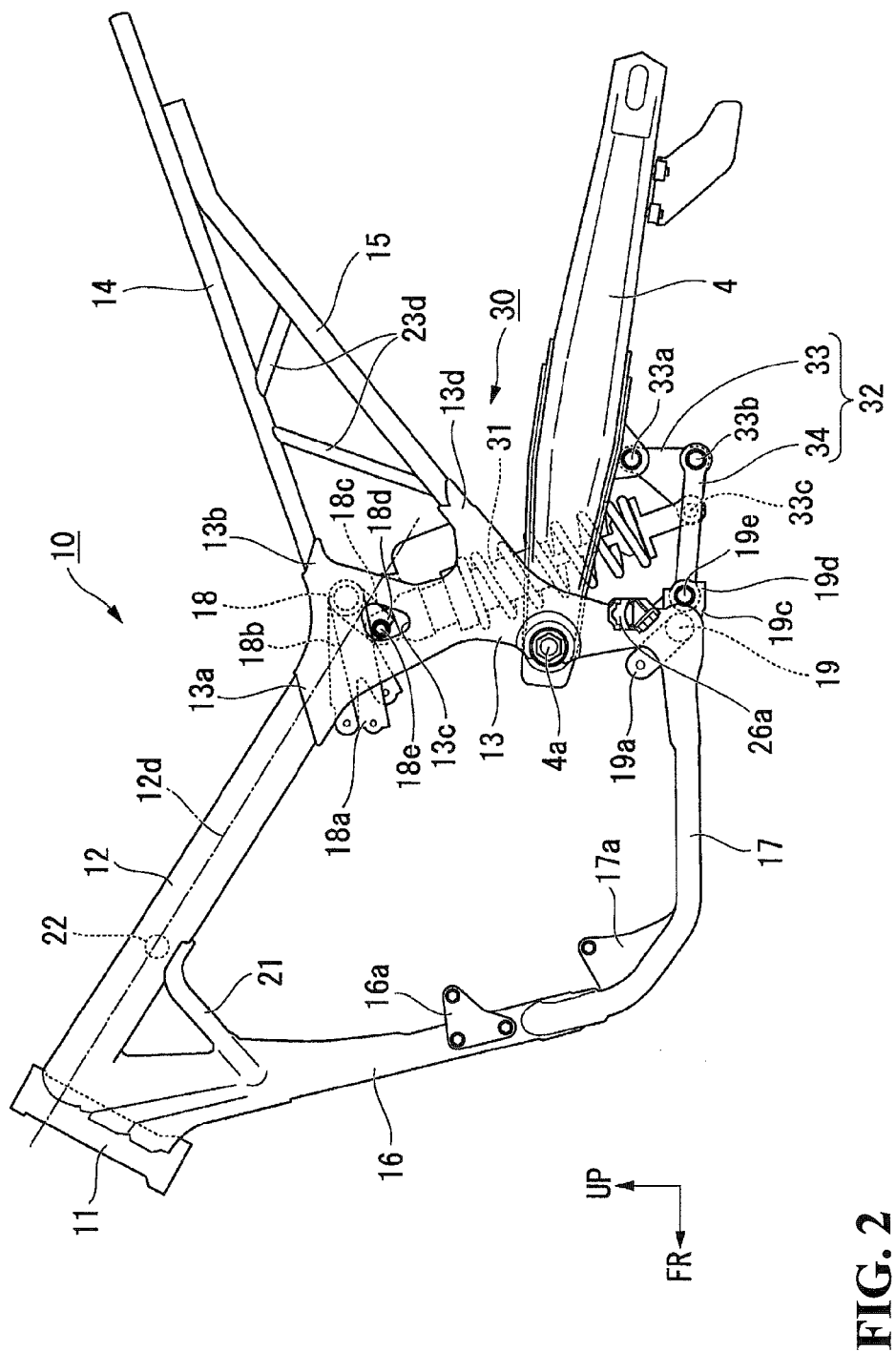
FIG. 2 is a left side view of a body frame and a rear suspension of the motorcycle.
Figure 3:
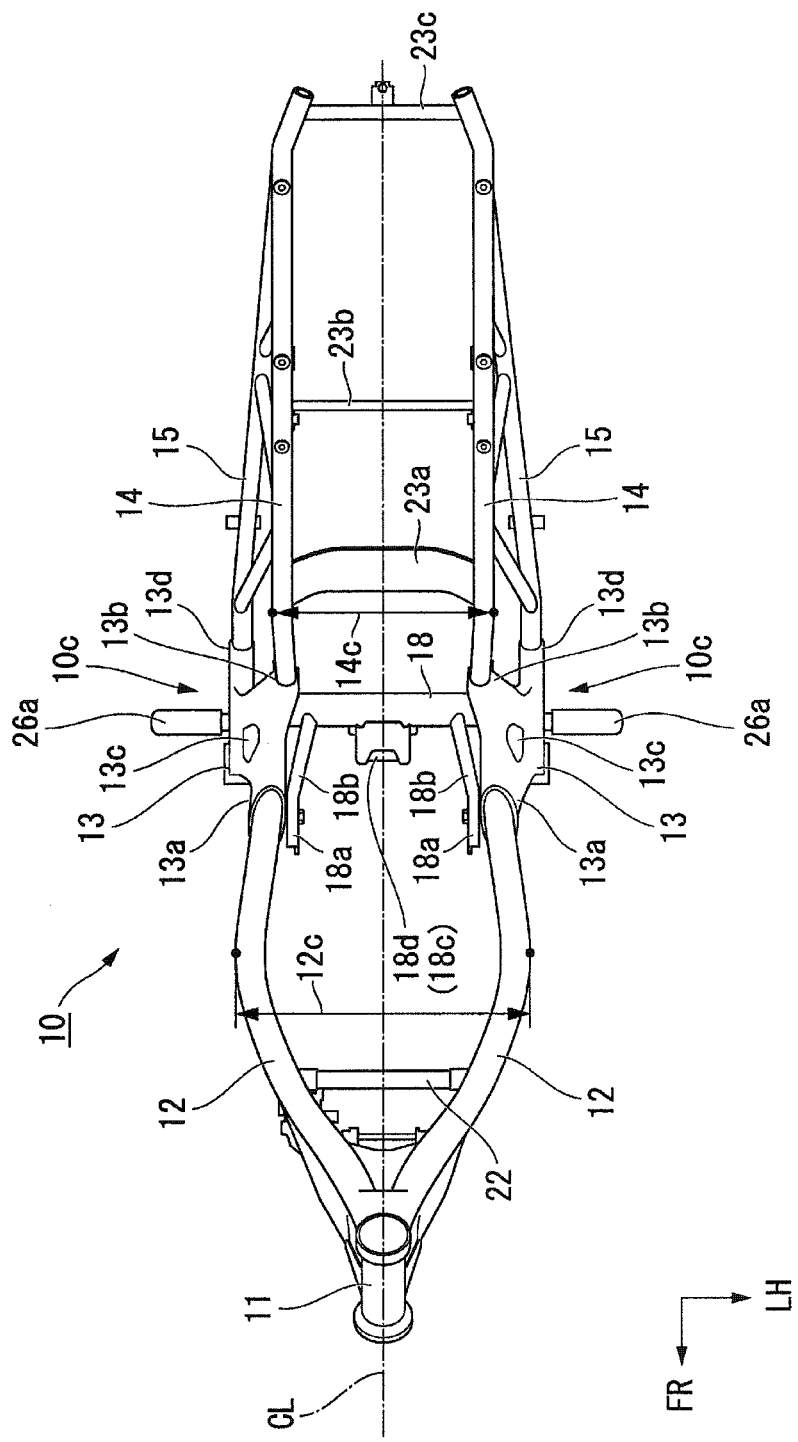
FIG. 3 is a top view of the body frame.

As shown in FIGS. 2 and 3, the body frame 10 is formed by integrally joining, by welding or the like, a plurality of kinds of steel. The body frame 10 is provided with: the head pipe 11; left and right main frames 12 that branch into left and right from an upper portion of the head pipe 11 to extend rearward and downward; left and right pivot frames 13 that extend downwardly from rear ends of the left and right main frames 12; left and right seat rails 14 that extend rearwardly and upwardly from upper ends of the left and right pivot frames 13; left and right sub-frames 15 that extend rearwardly and upwardly from lower portions of the left and right pivot frames 13 below the left and right seat rails 14 to be coupled to the left and right seat rails 14; a single down frame 16 that extends downwardly from a lower portion of the head pipe 11; and left and right lower frames 17 that branch left and right from a lower end of the down frame 16 and extend rearward to be coupled to lower ends of the left and right pivot frames 13.

Referring also to FIG. 7, the body frame 10 is equipped with the engine E forwardly of the left and right pivot frames 13 below the left and right main frames 12 located at the rear of the head pipe 11. The body frame 10 is a semi-double cradle type frame in which the engine E is surrounded from the front and below by the single down frame 16 and the left and right lower frames 17. Upper portions of the left and right pivot frames 13 are coupled by a cross member 18, and lower portions of the left and right pivot frames 13 are coupled by a lower cross member 19. The engine E is supported fixedly on the body frame 10 by a plurality of engine supporting portions provided in position on the body frame 10.

Specifically, in the engine E, a front end of a cylinder portion 42 is supported by a lower portion of the down frame 16 with a front upper mount bracket 16a therebetween; a front end of a crankcase 41 is supported by front portions of the left and right lower frames 17 with a front lower mount bracket 17a therebetween; the upper side of a rear end of the crankcase 41 is supported by the cross member 18 with a rear upper mount bracket 18a therebetween; and the lower side of a rear end of the crankcase 41 is supported by the lower cross member 19 with a rear lower mount bracket 19a therebetween.

Figure 4:
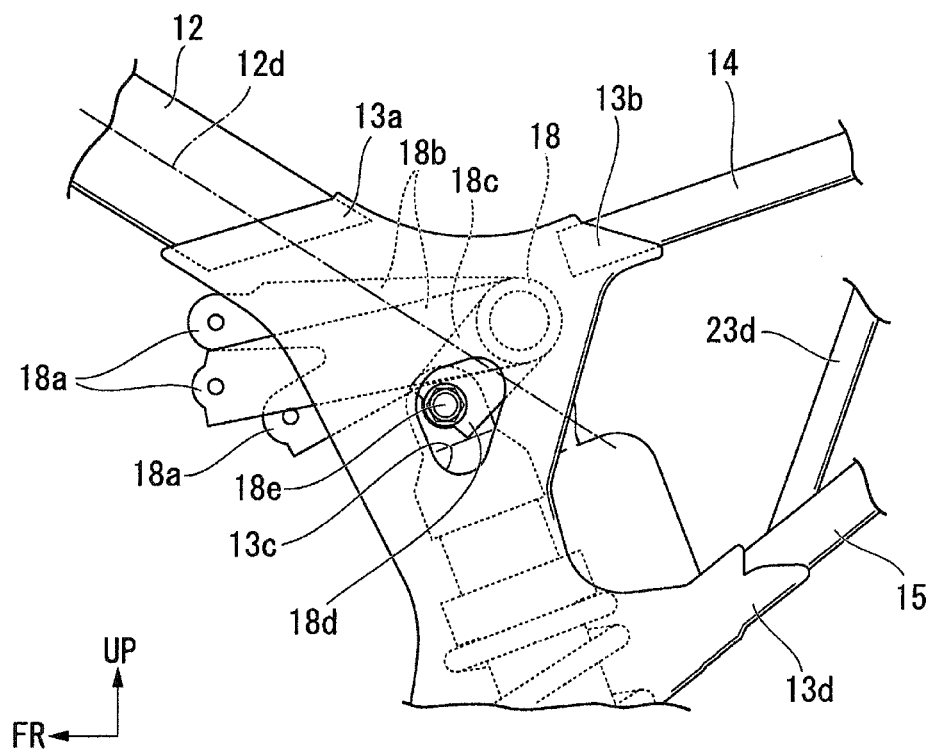
FIG. 4 is a left side view of the periphery of a pivot frame of the body frame.
Figure 5:
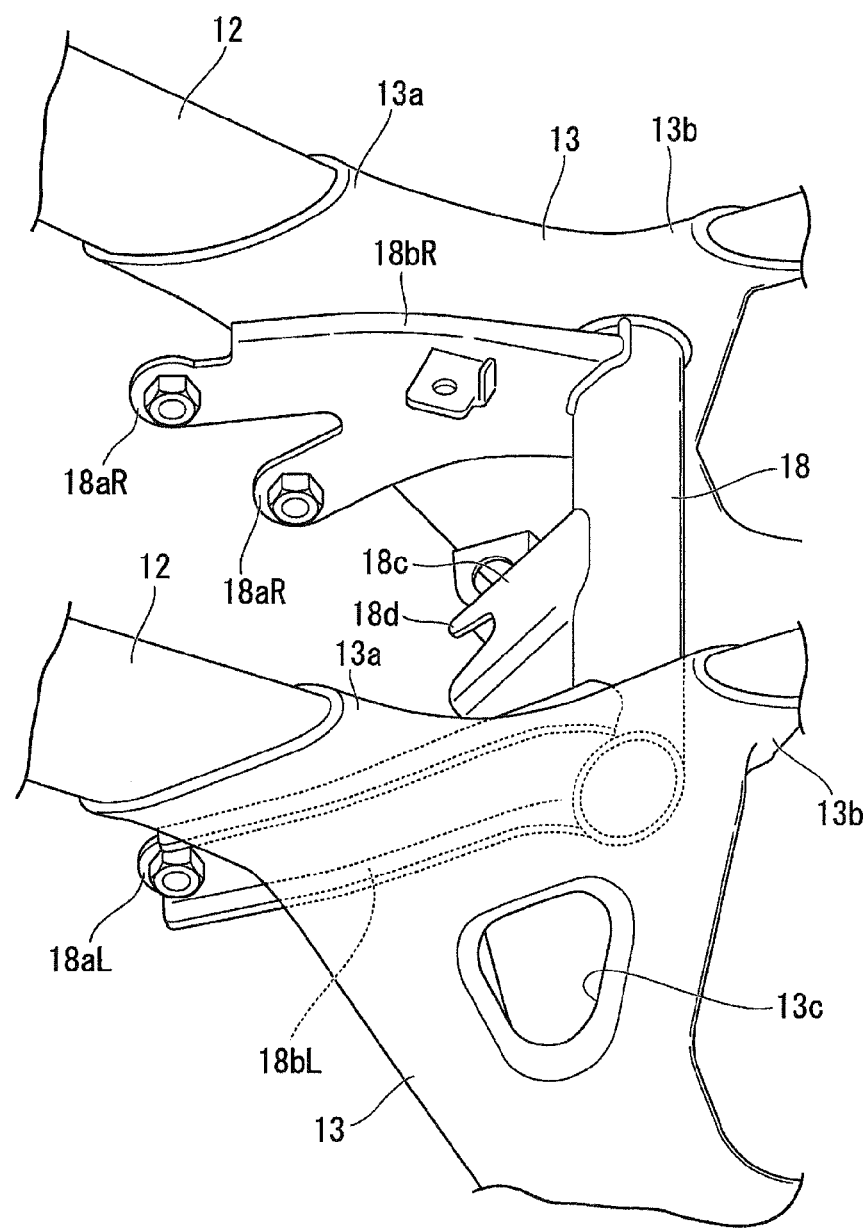
FIG. 5 is a perspective view of the periphery of the pivot frames as viewed from the upper left.

As shown in FIGS. 4 and 5, the rear upper mount bracket 18a is provided at leading ends of left and right mount arms 18b that extend forwardly from left and right side portions of the cross member 18. The left and right mount arms 18b are represented as left and right mount arms 18bL and 18bR, which are asymmetrical with respect to each other. The rear upper mount bracket 18a is represented as rear upper mount brackets 18aL and 18aR, which are provided at the leading ends, respectively, of the left and right mount arms 18bL and 18bR. For example, the right-hand rear upper mount bracket 18aR is formed in a forked shape.

The rear upper mount bracket 18a supports the engine E at a location further from the frame members of the body frame 10 than the other mount brackets 16a, 17a, and 19a. While the periphery of the cross member 18 coupling the upper portions of the left and right pivot frames 13 has high rigidity, the relatively-long left and right mount arms 18b are interposed between this portion and the engine E, thereby imparting a liveliness to the movement of the vehicle body without inhibiting the displacement of the periphery of the cross member 18 relative to the heavy engine E.

Referring to FIGS. 2 and 3, left and right gusset members 21 extending between front portions of the left and right main frames 12 and an upper portion of the down frame 16 are provided behind and below the head pipe 11.

Figure 12:
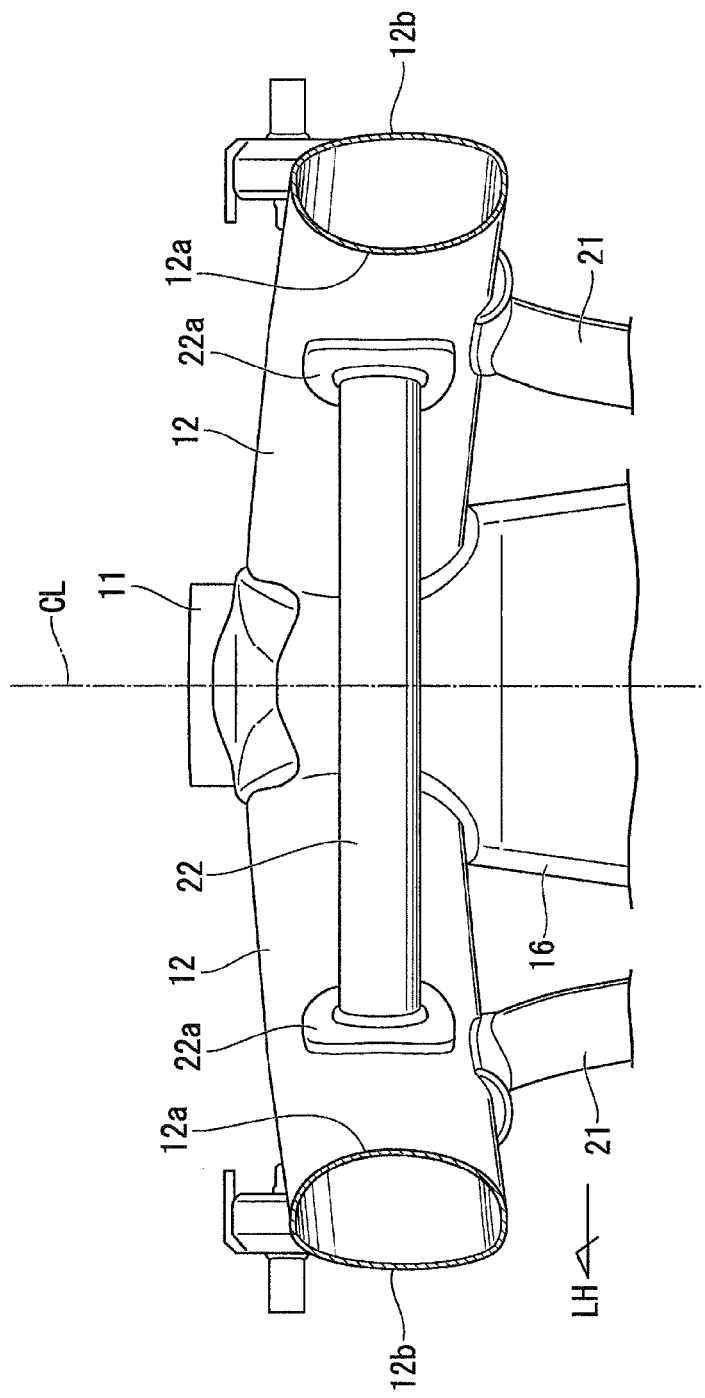
FIG. 12 is a perspective view of the periphery of a head pipe as viewed from behind so as to follow the main frames.

FIG. 12 shows the periphery of the cross member 22 stretched between front portions of the left and right main frames 12 in the vicinity of upper ends of the left and right gusset members 21. Each of the main frames 12 is of vertically-long hollow oval shape in cross section intersecting with the longitudinal direction thereof. More specifically, the main frame 12, in the above-described cross section, has an inner wall 12a in the form of a circular arc protruding inward in the vehicle width direction, and an outer wall 12b formed flatter than the inner wall 12a and extending vertically. Left and right ends of the cross member 22 are coupled to the inner walls 12a of the left and right main frames 12 with patch members 22a therebetween.

A front seat cross frame 23a, an intermediate seat cross frame 23b, and a rear seat cross frame 23c are stretched in order from the front between the left and right seat rails 14. A plurality of inclined frames 23d coupling the seat rail 14 and the sub-frame 15 in a truss in a side view on each side are stretched between the seat rail 14 and the sub-frame 15.

Referring to FIG. 3, the left and right main frames 12, in plan view (top view), extend rearward while curving so as to bulge outward in the vehicle width direction at the rear of the head pipe 11. Hereinafter, the portion where the distance between the left and right main frames 12 becomes a maximum is referred to as a between-main-frame maximum width portion 12c.

The left and right seat rails 14, in plan view, extend so as to be inclined slightly outward in the vehicle width direction at the rear of the left and right pivot frames 13, and then extend rearward along the longitudinal direction. Hereinafter, the portion where the distance between the left and right seat rails 14 becomes a maximum is referred to as a between-seat-rail maximum width portion 14c.

The body frame 10 forms a narrowed portion 10c between the between-main-frame maximum width portion 12c and the between-seat-rail maximum width portion 14c (between the upper portions of the left and right pivot frames 13), the narrowed portion 10c being narrower than both maximum width portions 12c and 14c.

The cross member 18 is stretched between the upper portions of the left and right pivot frames 13 on the narrowed portion 10c. Steps 26a for an occupant (rider) sitting in the rider seat 26 are disposed vertically below the narrowed portion 10c (vertically below the cross member 18). Thus, since the occupant's leg passes across the vicinity of the narrowed portion 10c, the comfort of the occupant and the foot grounding property are improved. Furthermore, the length of the cross member 18 is shortened to suppress deflection, thereby making loads and vibrations on the seat rails 14 less likely to be transmitted to the main frames 12.

Referring to FIGS. 1 and 7, a frame cover 26b for covering the outer surface of the pivot frame 13 is mounted above the step 26a. On the sub-frame 15, a step 27a for an occupant (pillion passenger) sitting in the pillion passenger seat 27 is supported with a step bracket 27b therebetween.

Referring to FIGS. 2 and 4, an upper portion of the pivot frame 13 has approximately the shape of an inverted triangle in a side view, a front upper portion thereof serving as a main frame coupling portion 13a, and a rear upper portion thereof serving as a seat rail coupling portion 13b. A central portion of the upper portion of the pivot frame 13 is formed with an opening portion 13c passing therethrough in the vehicle width direction. The cross member 18 is disposed between the opening portion 13c of the pivot frame 13 and the seat rail coupling portion 13b. A sub-frame coupling portion 13d extending upward and rearward is formed at a rear portion of the pivot frame 13.

A line segment 12d along the longitudinal direction of the main frame 12 as shown in FIGS. 2 and 4 is a line segment, which passes through the center of a main-frame width direction perpendicular to the longitudinal direction of the main frame 12 in a side view. The cross member 18, in a side view, is disposed above an extension to the rear of the line segment 12d. Thus, since the cross member 18 is disposed in such a manner as to avoid the center of the main-frame width direction, the main frame 12 and the main frame coupling portion 13a become more likely to deflect than when the cross member 18 is disposed at the center of the main-frame width direction. Furthermore, by the upward movement of the cross member 18, the space below the cross member 18 is increased and the rear cushion 31 is easily disposed.

Referring to FIGS. 3 and 5, a cushion support bracket 18c extending forward and downward is fixedly provided at a horizontal central portion of the cross member 18. The cushion support bracket 18c forms a cushion upper end coupling portion 18d at a leading end portion thereof. That is, the cushion upper end coupling portion 18d is disposed at a distance forward of and below the cross member 18. Thus, while the rear cushion 31 is brought closer to the engine E to achieve mass concentration, the cross member 18 is brought closer to the seat rails 14 to also support the loads on the seat rails 14, thereby making it less likely that loads, vibrations, etc. on the seat rails 14 side are transmitted to the main frames 12 side. Furthermore, the rear cushion 31 is inclined forward, thereby allowing securing a component arrangement space above and behind the rear cushion 31. An auxiliary machine arrangement box 28 is provided in this space, in which various electric components (an ABS modulator, canister, ETC unit, etc.) are stored. In an off-road vehicle, many components are arranged in the upper space of the forwardly-inclined rear cushion 31, thereby allowing a reduction in the height of the rider seat 26 and the pillion passenger seat 27 while ensuring an oscillating range of the rear wheel 5.

Referring to FIG. 2, the rear suspension 30, serving as the rear wheel suspension system, is provided with the swing arm 4, the linkage mechanism 32, and the rear cushion 31. The rear suspension 30 is configured such that the front end of the swing arm 4 is coupled to the vertical intermediate portions of the left and right pivot frames 13 with the pivot shaft 4a therebetween, and an upper end of the rear cushion 31 is coupled to the cushion upper end coupling portion 18d with a turning shaft 18e therebetween.

The linkage mechanism 32 has: a linkage member 33 of triangular shape in a side view which has an upper end coupled to a lower front portion of the swing arm 4 with a turning shaft 33a therebetween; and a linkage arm 34 that has a rear end coupled to a rear lower portion of the linkage member 33 with a turning shaft 33b therebetween, and a front end coupled to a linkage front end coupling portion 19d, which is located at a lower end of the pivot frame 13, with a turning shaft 19e therebetween. A lower end of the rear cushion 31 is coupled to a front lower portion of the linkage member 33 with a turning shaft 33c therebetween. Each of the turning shafts 18e, 19e, 33a, 33b, and 33c is a shaft that extends along the horizontal direction in the same manner as the pivot shaft 4a, and configured from, for example, a shaft portion of a shoulder bolt.

The rear cushion 31 has approximately a cylindrical outer shape and extends vertically along the direction of the forwardly-inclined axis (longitudinal direction). The cushion upper end coupling portion 18d supporting the upper end of the rear cushion 31 is located inward of the opening portion 13c of the pivot frame 13 in a side view. That is, the cushion upper end coupling portion 18d is exposed on the outside in the vehicle width direction through the opening portion 13c and designed to detachably mount a tool through the opening portion 13c. Thus, work, such as fastening to the rear cushion supporting portion (turning shaft 18e), can be performed through the opening portion 13c, resulting in an improvement in working efficiency, such as attaching/detaching of the rear cushion 31.

The auxiliary machine arrangement box 28 is provided above and behind the rear cushion 31 below the rider seat 26. The ABS modulator, canister, ETC unit and the like as electric components, are stored in the auxiliary machine arrangement box 28. The auxiliary machine arrangement box 28 allows access to the electric components from above, for example by removal of the rider seat 26.

Figure 11:
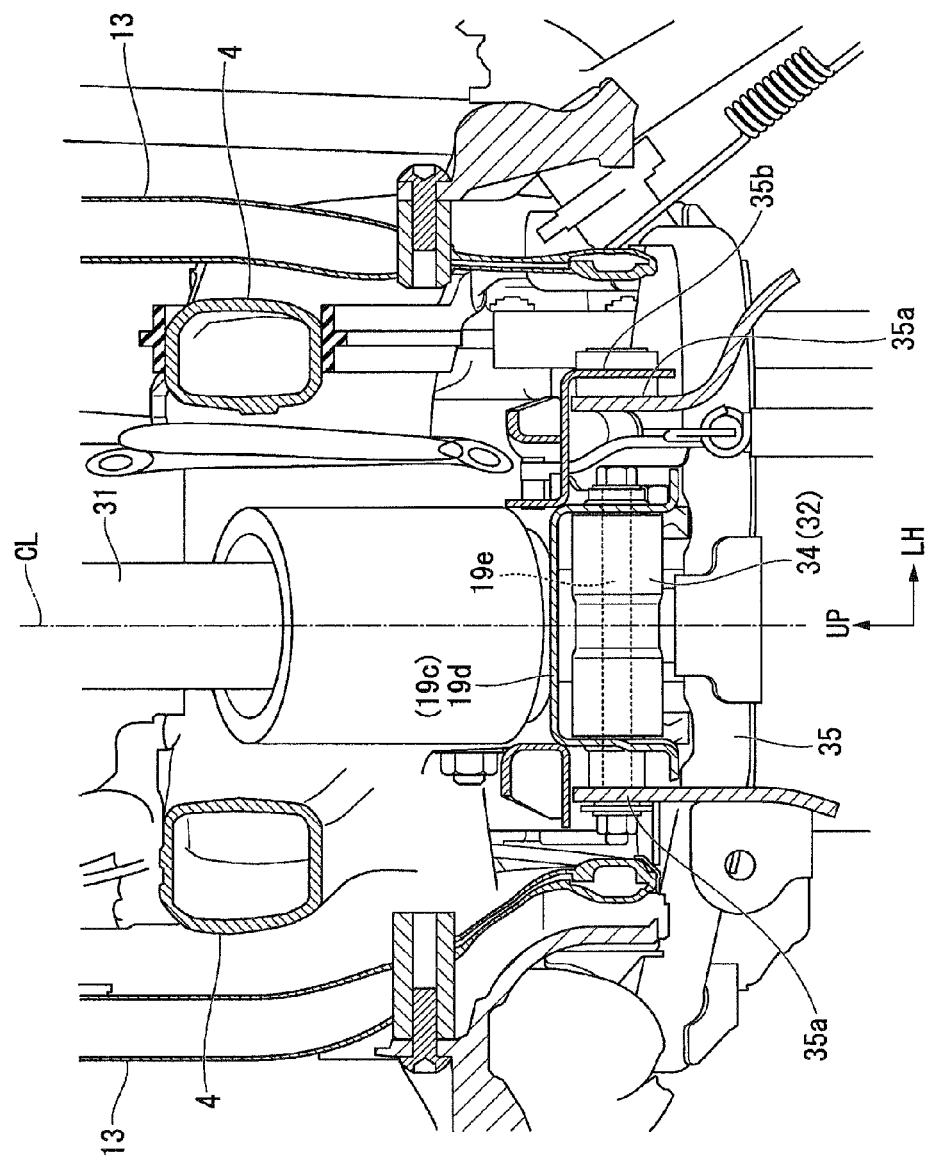
FIG. 11 is a sectional view of a cross section perpendicular to the longitudinal direction in the periphery of a lower cross member as viewed from the front.

Referring to FIGS. 1 and 11, a linkage support bracket 19c is fixedly provided on the lower cross member 19 located at the lower portions of the pivot frames 13. The linkage support bracket 19c forms the linkage front end coupling portion 19d for coupling a front end of the linkage arm 34. The front end of the linkage arm 34 is provided in a cylindrical shape extending between front ends of left and right arm bodies.

Left and right base end portions 35a of a main stand 35 of the motorcycle are turnably supported by the linkage support bracket 19c and a stand support bracket 35b adjacent to the linkage support bracket 19c. The main stand 35 can be turned between a use position, where it extends downwardly from the left and right base end portions 35a and supports the vehicle body upright, and a storage position, where it extends rearwardly from the left and right base end portions 35a and separates from the ground. The left and right base end portions 35a of the main stand 35 are supported coaxially with the front end of the linkage arm 34 by the linkage support bracket 19c and the stand support bracket 35b.

Engine, Etc.

Referring to FIGS. 1 and 7, the engine E is installed below the left and right main frames 12, forwardly of the left and right pivot frames 13. The engine E is provided with a crankcase 41 that houses a crankshaft and a transmission integrally, and the cylinder portion 42 that is erected upwardly and forwardly from the front of the top face of the crankcase 41. The engine E is, for example, a parallel twin cylinder engine, in which two cylinders are formed side by side in the horizontal direction (vehicle width direction) within the cylinder portion 42.

An intake passage including a throttle body (not shown) is connected to the rear of a cylinder head 42a of the cylinder portion 42. An exhaust pipe 48 for each cylinder is connected to the front of the cylinder head 42a. The exhaust pipes 48 are bent to extend downward at the front of the cylinder portion 42, and then curved rearward and routed below the crankcase 41 to join together, and thereafter connected to a silencer 48a that is disposed on the right side of a rear portion of the vehicle body. The crankcase 41 and the exhaust pipes 48 are covered with an undercover 41a from below. A battery 49 is disposed at a portion to the rear of the cylinder portion 42 and above the crankcase 41, and, in a side view, at a portion surrounded by the cylinder portion 42, the main frame 12, the pivot frame 13, and the crankcase 41.

Figure 9:
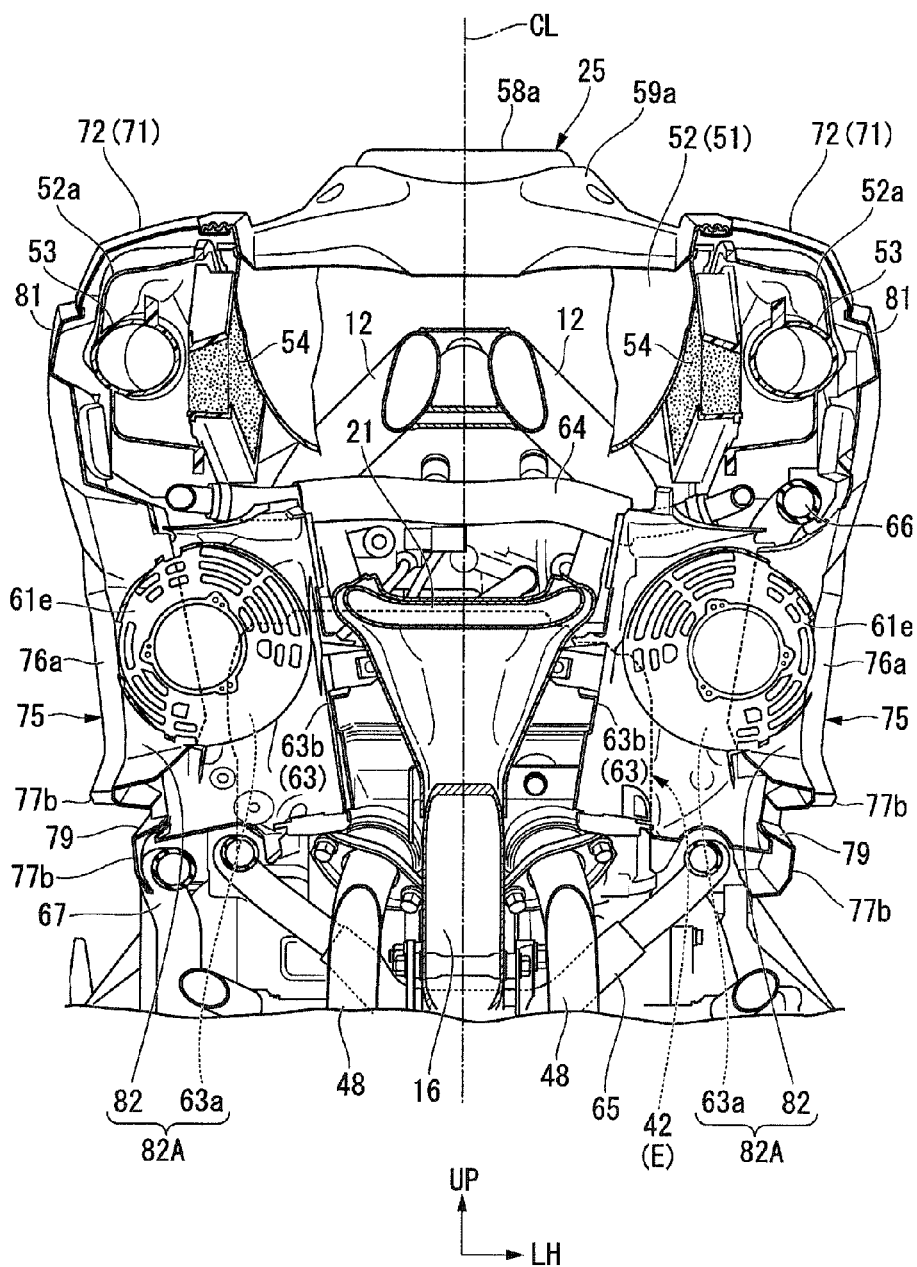
FIG. 9 is a sectional view taken along line IX of FIG. 6.
Figure 10:
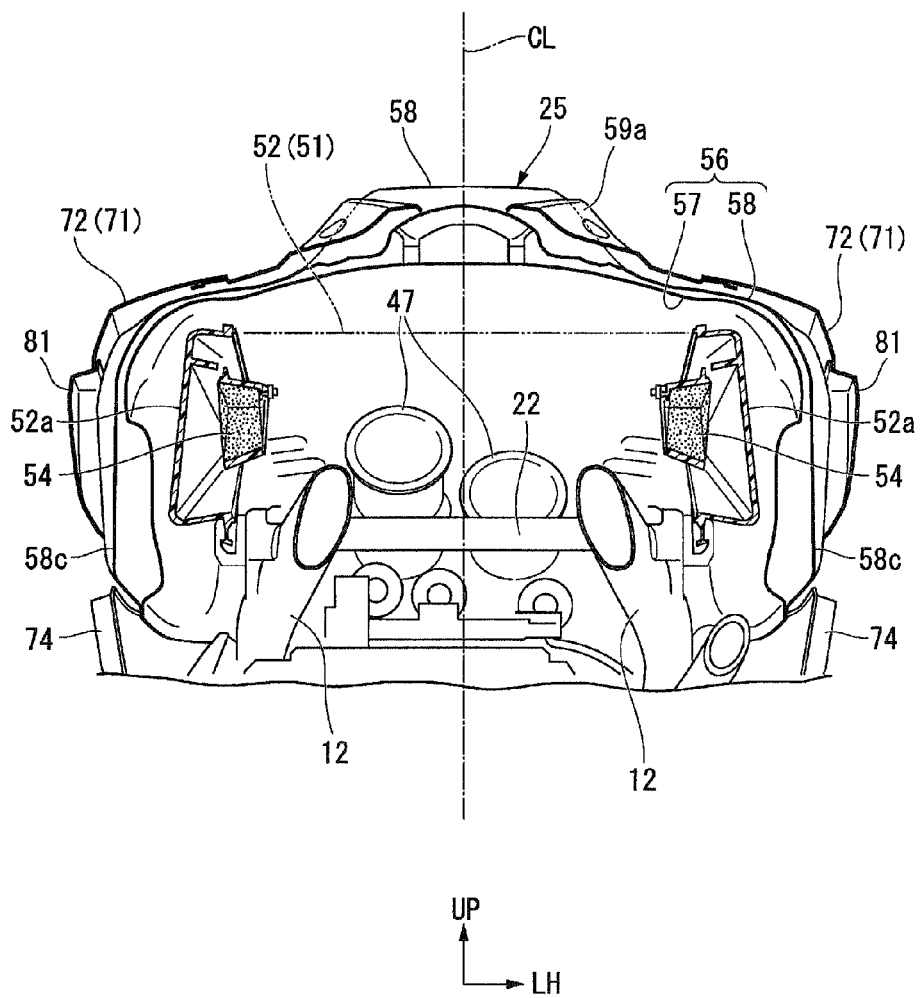
FIG. 10 is a sectional view taken along line X of FIG. 6.

Referring to FIGS. 7, 9, and 10, an air cleaner 51 connected to an upstream end of the intake passage is disposed between an upper portion of the head pipe 11 and a front portion of the fuel tank 25. The air cleaner 51 is provided so as to extend horizontally between front portions of the left and right main frames 12. The air cleaner 51 has an air cleaner case 52 that forms its appearance, and left and right intake ducts 53 that are curved to extend forwardly from left and right side portions 52a of the air cleaner case 52 and open forward.

The left and right side portions 52a of the air cleaner case 52 overhang more outward in the vehicle width direction than the left and right main frames 12. The left and right side portions 52a of the air cleaner case 52 extend forward and downward on the outer side in the vehicle width direction than the left and right main frames 12 so as to overlap the left and right main frames 12 in a side view. The left and right side portions 52a of the air cleaner case 52 are detachably mounted together with the left and right intake ducts 53. An air cleaner element 54 is held within each of the left and right side portions 52a of the air cleaner case 52. Left and right funnels 47 serving as the upstream ends of the intake passages of the cylinders are unsymmetrically supported by rear wall portions of the air cleaner case 52.

Referring to FIG. 10, the fuel tank 25 has a steel tank bottom plate 57 that faces the tank lower side, and a steel tank outer plate 58 that covers a space above the tank bottom plate 57. Joining flanges are continuously provided on outer peripheral edges of the tank bottom plate 57 and the tank outer plate 58, and integrally joined so as to overlap each other to form a hollow tank body 56.

Referring additionally to FIG. 7, the tank outer plate 58 forming the appearance of the tank body 56 has: a top portion 58a that forms an approximately-horizontal filler opening mounting surface above the head pipe 11 and the air cleaner case 52; a rearwardly and downwardly inclined portion 58b that is inclined to extend rearward and downward at the rear of the top portion 58a; left and right overhang portions 58c that extend downward on both left and right sides of the top portion 58a and overhang more outward in the vehicle width direction than the left and right main frames 12; and knee grip portions 58d that, at the rear of the left and right overhang portions 58c, are each gradually narrowed down to the same horizontal width as that of the left and right main frames 12.

The left and right overhang portions 58c extend downward so as to overlap front portions of the main frames 12 in a side view. Between the left and right overhang portions 58c, the tank bottom plate 57 is formed in a saddle shape so as to straddle the main frames 12 and the air cleaner 51. The left and right overhang portions 58c overhang more outward in the vehicle width direction than the left and right side portions 52*a* of the air cleaner 51. Moldings 59 for concealing the joining flanges of the tank body 56 are mounted below the knee grip portions 58*d*. A tank upper cover 54*a* is mounted on the periphery of the top portion 58*a*. A front portion of the rider seat 26 rides, from above and behind, on a rear portion of the rearwardly and downwardly inclined portion 58*b*.

Radiator

Figure 8:
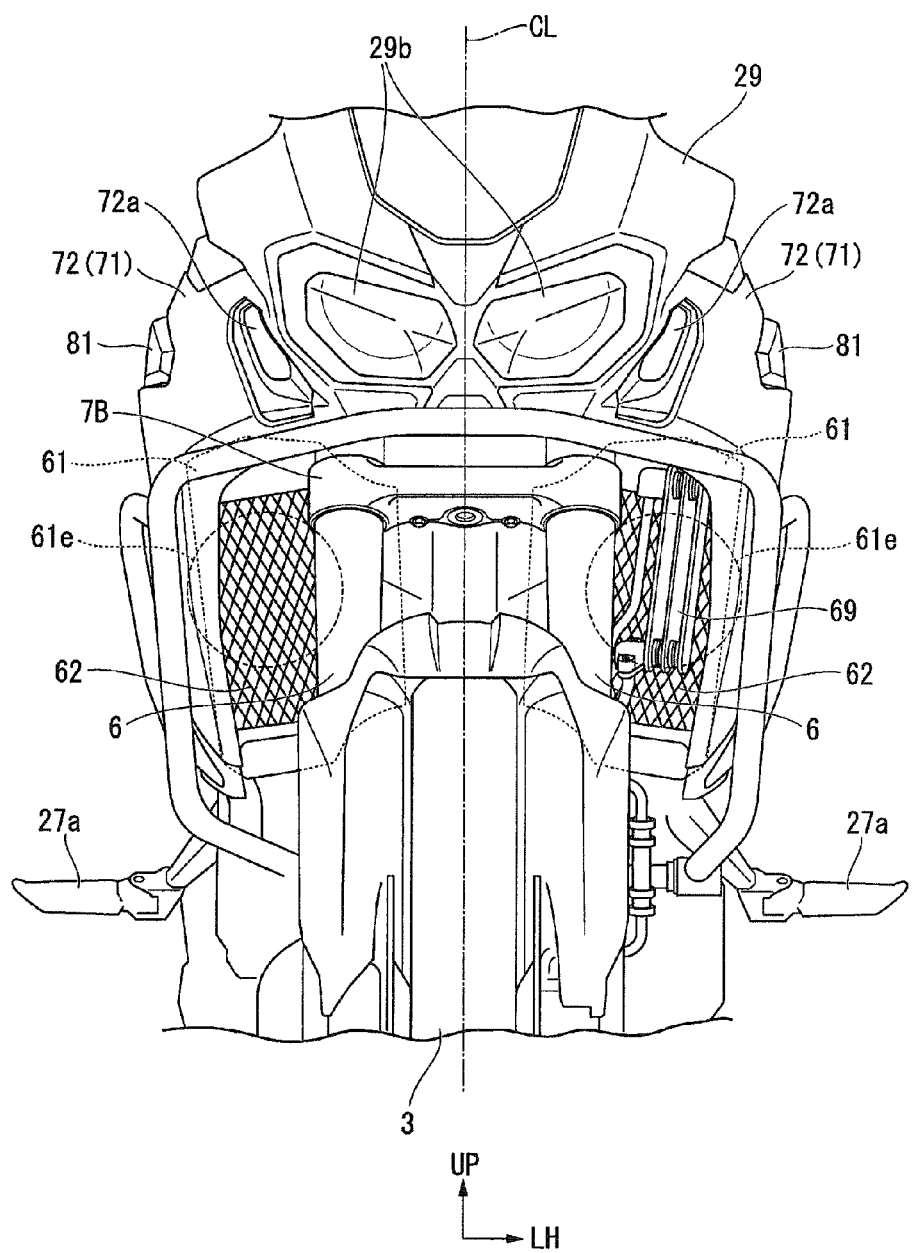
FIG. 8 is a front view of the motorcycle.

Referring to FIGS. 7 and 8, left and right radiators 61 are arranged on the left and right sides of the down frame 16. The left and right radiators 61 are each formed in a thick plate shape and are disposed upright in intersecting relation to the vehicle longitudinal direction. The left and right radiators 61 are arranged inclined so as to be positioned forward toward the outer side in the vehicle width direction. Each of the left and right radiators 61, in a front view, is formed in a trapezoidal shape in which side portions on the inside and outside in the vehicle width direction are opposite sides almost parallel to each other and the side portion on the outside in the vehicle width direction is set longer than the side portion on the inside in the vehicle width direction. In each of the left and right radiators 61, the side portion on the inside in the vehicle width direction is supported by the outer surface of the down frame 16, and the side portion on the outside in the vehicle width direction is supported by the inner surface of a radiator shroud 71.

In each of the left and right radiators 61, upper and lower horizontally-long tanks 61*b* and 61*c* are fixedly provided on upper and lower portions of a radiator core 61*a* so as to follow the upper and lower inclined sides, respectively, of the trapezoidal shape. A mesh radiator grille 62 is disposed at the front of the radiator core 61*a*, and a radiator air guide plate 63 is disposed at the rear of the radiator core 61*a*.

Figure 6:
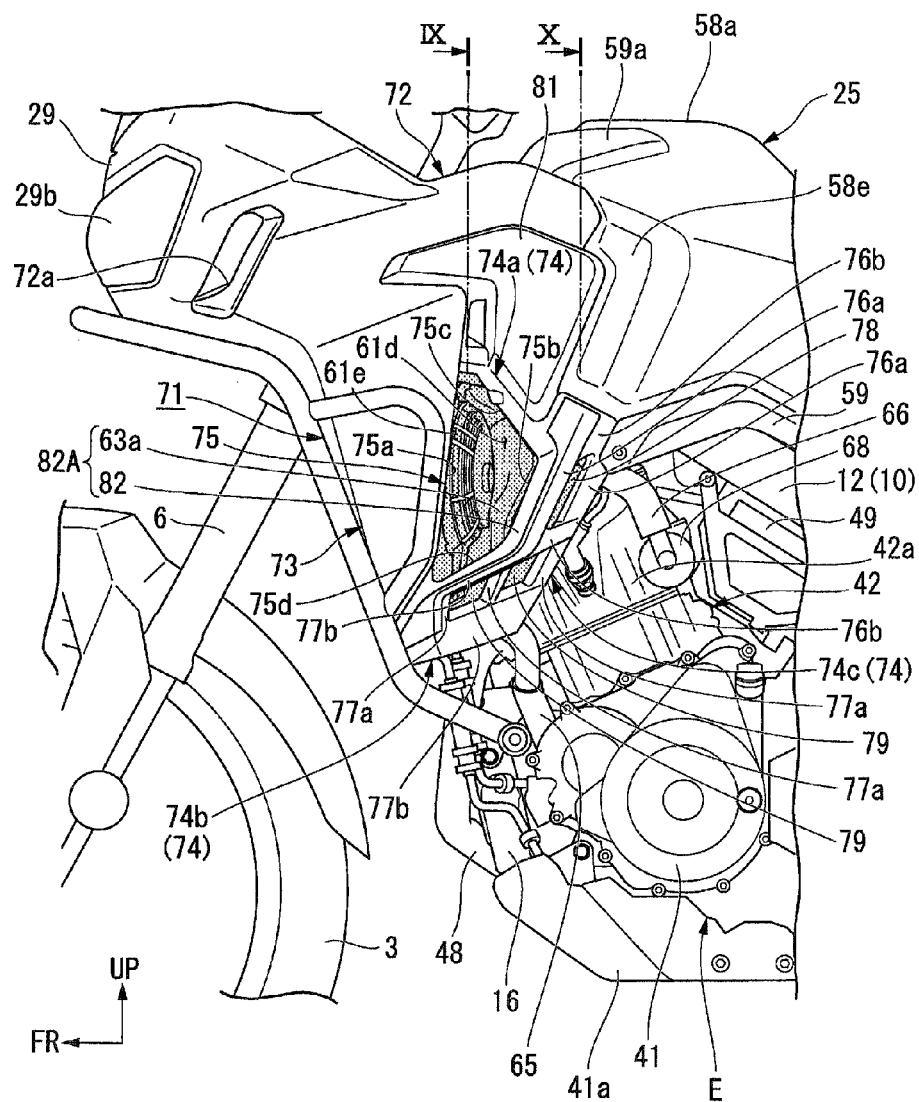
FIG. 6 is a left side view of the periphery of a radiator shroud of the motorcycle.

Referring also to FIGS. 6 and 9, a radiator air guide plate 63 is formed in a shape bulging toward the rear from the radiator core 61*a*. The radiator air guide plate 63 covers the radiator core 61*a* from behind so as to leave a space therebetween, a rear space 61*d* of the radiator core 61*a* opening outward in the vehicle width direction. The radiator air guide plate 63 forms an upstanding wall 63*a* that guides, to the outside in the vehicle width direction, outside air passing through the radiator core 61*a* into the rear space 61*d*, and an inner wall 63*b* that upstands forward on the inside in the vehicle width direction of a radiator fan 61*e*.

The upper tanks 61*b* of the left and right radiators 61 are connected by an upper communication hose 64, so as to communicate with each other, and the lower tanks 61*c* of the left and right radiators 61 are connected by a lower communication hose 65, so as to communicate with each other. In this embodiment, a cooling-water inflow hose 66 is connected to the upper tank 61*b* of the left radiator 61, and a cooling-water outflow hose 67 is connected to the lower tank 61*c* of the right radiator 61. The cooling-water inflow hose 66 extends forwardly upwardly from a thermostat 68 disposed in the left rear of the cylinder head 42*a* to the upper tank 61*b* of the left radiator 61. The cooling-water outflow hose 67 extends rearwardly downwardly from the lower tank 61*c* of the right radiator 61 to a water pump (not shown) disposed on the lower right side of the crankcase 41.

In this embodiment, an air-cooled oil cooler 69 is disposed on the outside in the vehicle width direction forwardly of the left radiator core 61*a*. The oil cooler 69 is formed slimmer than the radiator 61 and is disposed with the longitudinal axis thereof aligned with the vertical direction.

The radiator fans 61*e* are disposed on the rear surfaces of the radiator cores 61*a* of the left and right radiators 61. Each of the radiator fans 61*e* is an axial flow fan, which is disposed with the axis thereof aligned with the thickness direction (ventilation direction) of the radiator core 61*a*. The radiator fan 61*e* causes air passing through the radiator core 61*a* to flow into the rear space 61*d*. Due to the above-described inclined arrangement, the thickness direction (ventilation direction) of the radiator core 61*a* (radiator 61) is inclined so as to be positioned on the outer side in the vehicle width direction toward the rear in the vehicle longitudinal direction. In accordance with this inclination, the axial direction of the radiator fan 61*e* is also inclined so as to be positioned on the outer side in the vehicle width direction toward the rear in the vehicle longitudinal direction. Thus, the radiator fan 61*e* causes the air passing through the radiator core 61*a* to flow rearward and to the outside in the vehicle width direction.

The radiator fan 61*e* is disposed within the rear space 61*d* of the radiator core 61*a* and is covered with the radiator air guide plate 63 from the inside in the vehicle width direction and behind. The radiator fan 61*e* is exposed lateral to the vehicle through a portion opening outward in the vehicle width direction of the radiator air guide plate 63 and an exhaust port 75 of the radiator shroud 71. The air caused to flow rearward and to the outside in the vehicle width direction by the radiator fan 61*e* is guided to the outside in the vehicle width direction along a partition wall 82A that includes the upstanding wall 63*a* of the radiator air guide plate 63 and an inner wall 82 of the radiator shroud 71, and discharged to the outside in the vehicle width direction through the exhaust port 75 of the radiator shroud 71.

Radiator Shroud

Referring to FIG. 6, the left and right radiator shrouds 71 are provided on either side of a lower portion of the front cowl 29, for covering the left and right radiators 61, the cylinder head 42*a* located at the rear of the radiators 61, etc. from the outside in the vehicle width direction. The radiator shroud 71, in a side view, is provided so as to bulge rearwardly and downwardly from outside the lower portion of the front cowl 29 and in generally approximately the shape of an inverted triangle.

The radiator shroud 71 has: a cowl side portion 72 that laterally covers a range from outside the lower portion of the front cowl 29 to the outside of a front end of the fuel tank 25; a front shroud 73 that extends downwardly from a front portion of the cowl side portion 72 to laterally cover the radiator 61; and a rear shroud 74 that is coupled to the lower side of a rear portion of the cowl side portion 72 and the rear of the front shroud 73.

A forward opening intake port 72*a* is provided at a front end of the cowl side portion 72. The intake port 72*a* supplies travelling air to the intake duct 53 of the air cleaner 51 facing into the cowl side portion 72. The front shroud 73 is integrally provided on the lower front portion of the cowl side portion 72.

The rear shroud 74 forms the exhaust port 75 at the rear of a rear edge of the front shroud 73, the exhaust port 75 discharging the outside air passing through the radiator 61 to the outside in the vehicle width direction. The rear shroud 74 also forms a plurality of small openings 78 and 79 around the exhaust port 75. The rear shroud 74 conceals rubber pipes of a radiator hose, etc. behind the wall portion except the small openings 78 and 79, while making metal components of the cylinder head 42*a*, etc. covered by the rear shroud 74 itself visible through the small openings 78 and 79.

The exhaust port 75, in a side view, has: a front side 75*a* that is formed by the rear edge of the front shroud 73 and is slightly inclined so as to be positioned rearward toward the upper side; a rear side 75b that is provided at the rear of the front side 75a so as to be inclined more rearward than the front side 75a; an upper side 75c that extends between upper ends of the front and rear sides 75a and 75b and is provided so as to be inclined rearward and downward; and a lower side 75d that extends between lower ends of the front and rear sides 75a and 75b and is provided so as to be inclined rearward and upward.

The rear shroud 74 has an upper frame 74a that conforms to the upper side 75c of the exhaust port 75, and a lower frame 74b that conforms to the lower side 75d, front ends of the upper and lower frames 74a and 74b being coupled to the front shroud 73 from behind. The rear shroud 74 also has a rear frame 74c, which is located between rear ends of the upper and lower frames 74a and 74b and conforms to the lower side 75b of the exhaust port 75.

In the rear frame 74c, a small slit-shaped opening 78 conforming to the rear side 75b is formed by two, front and rear vertical walls 76a conforming to the rear side 75b, and two, upper and rear horizontal walls 76b inclined upwardly toward the rear in the same manner as the lower side 75d.

In the lower frame 74b, two small openings 79 of parallelogram shape conforming to the lower side 75d are formed by two, upper and lower horizontal walls 77b conforming to the lower side 75d, and three, front and rear vertical walls 77a inclined rearward in the same manner as the rear side 75b. The horizontal wall 77b of the lower frame 74b below the small openings 79 is vertically wider than the other horizontal wall 77b and the vertical walls 77a. An outside portion of the lower communication hose 65 allowing communication between the lower tanks 61c of the left and right radiators 61 is disposed inside in the vehicle width direction of the horizontal wall 77b (see FIGS. 7 and 9). Thus, the outside portion of the lower communication hose 65 is covered with the horizontal wall 77b from the outside in the vehicle width direction.

A pad portion 81 having a rearwardly-protruding V shape in a side view is provided at an upper portion of the radiator shroud 71. At the rear of the pad portion 81, a rear portion of the radiator shroud 71 is cut away, and a bulge portion 58e protruding further outwardly in the vehicle width direction from the overhang portion 58c of the fuel tank 25 is provided so as to align with the cut-away portion. The bulge portion 58e, in a side view, has a rearwardly-protruding V shape and forms the appearance integral with the radiator shroud 71. The bulge portions 58e increase the capacity of the fuel tank 25, and suppress the exposure of the occupant's knees to wind by overhanging outward in the vehicle width direction at the front of the knee grip portions 58d. While each of the bulge portions 58e serves as the outermost portion of the fuel tank 25, which overhangs most outward in the vehicle width direction, the pad portion 81 of the radiator shroud 71 is provided so as to overhang more outward in the vehicle width direction than the bulge portion 58e.

Each of the radiator shrouds 71 is an exterior component in which the cowl side portion 72 and the front shroud 73 having a relatively large amount of flat surface are integral to form a resin component and coating is applied thereto in the same manner as the front cowl 29. In the radiator shroud 71, the rear shroud 74 and the pad portion 81 are made of colored resin, and surface treatment, such as embossing, is further applied to the pad portion 81, so that scratches made by external contacts are made inconspicuous.

Referring to FIGS. 6 and 9, the radiator shroud 71 has an inner wall 82 that upstands inwardly in the vehicle width direction from the upper and lower sides 75c and 75d and the rear side 75b of the exhaust port 75. The inner wall 82 is provided so as to be continuous with the outside in the vehicle width direction of the upstanding wall 63a of the radiator air guide plate 63, and, in cooperation with the upstanding wall 63a, forms the partition wall 82A that separates the radiator 61 (radiator fan 61e) and the cylinder head 42a from each other. The partition wall 82A is inclined so as to be positioned rearward toward the outer side in the vehicle width direction, thereby guiding the exhaust air from the radiator fan 61e to the exhaust port 75 side (outside in the vehicle width direction) and preventing the flow of the hot exhaust air to the cylinder head 42a.

As described above, in the motorcycle 1 according to the above-described embodiment, the engine E is supported on the body frame 10, and the radiators 61 are disposed forward of the engine E. The motorcycle 1 includes the radiator shroud 71 that covers a range from a lateral side of each of the radiators 61 to a lateral side of the cylinder head 42a of the engine E. The radiator shroud 71 has the exhaust port 75 opening outward in the vehicle width direction. The motorcycle 1 also includes the partition wall 82A between the radiator 61 and the cylinder head 42a, the partition wall 82A separating the rear space 61d of the radiator 61 and the cylinder head 42a from each other and bringing the rear space 61d into communication with the exhaust port 75 of the radiator shroud 71.

With this configuration, waste heat of the radiator 61 is prevented from reaching the cylinder head 42a and can be discharged to the outside in the vehicle width direction through the exhaust port 75 of the radiator shroud 71. Furthermore, the discharge of air from the radiator shroud 71 to the outside in the vehicle width direction can also make the waste heat of the radiator 61 less likely to reach an occupant.

The above-described motorcycle further includes the radiator fan 61e on a rear surface of the radiator 61, the downstream side thereof being inclined outward in the vehicle width direction. The partition wall 82A extends in the vehicle width direction at the rear of the radiator fan 61e.

With this configuration, the waste heat reaching the rear of the radiator 61 is guided to the outside in the vehicle width direction by the partition wall 82A, and can be forcibly discharged to the outside in the vehicle width direction by the radiator fan 61e. The above-described motorcycle further includes the fuel tank 25 above the engine E. The rear portion of the fuel tank 25 is formed with the knee grip portions 58d, and the front portion of the fuel tank 25 is formed with the bulge portions 58e, the bulge portions 58e bulging outward in the vehicle width direction. The radiator shroud 71 is provided with the pad portion 81. The pad portion 81 is disposed forward of the bulge portion 58e and protrudes more outward in the vehicle width direction than the bulge portion 58e.

With this configuration, with the bulge portions 58e located forward of the knee grip portions 58d, it is possible to form the knee grip portions 58d, which are comfortable to touch, while suppressing the exposure of the occupant's legs to wind, and to increase the capacity of the fuel tank 25. Furthermore, with the pad portion 81 of the radiator shroud 71, it is possible to suppress scratches on the fuel tank 25.

Moreover, in the above-described motorcycle, the radiator shroud 71 has the front shroud 73 that extends laterally of the radiator 61 from a side portion of the front cowl 29, and the rear shroud 74 that is coupled to the rear of the front shroud 73. The rear shroud 74 has the upper frame 74a and the lower frame 74b which are coupled to the front shroud 73. The exhaust port 75 is formed between the upper frame 74a and the lower frames 74b.

With this configuration, the upper frame 74a and the lower frames 74b of the rear shroud 74 securely couple the front and rear shrouds 73 and 74 and can efficiently form the exhaust port 75 between the upper and lower coupling portions of the front and rear shrouds 73 and 74.

Further, in the above-described motorcycle, the rear shroud 74 forms the small openings 78 and 79 around the exhaust port 75, the small openings 78 and 79 being surrounded by the vertical walls 76a and 77a extending vertically and the horizontal walls 76b and 77b extending longitudinally. The water pipe (lower communication hose 65) of the radiator 61 is covered with at least the vertical walls 76a and 77a or the horizontal walls 76b and 77b.

With this configuration, it is possible to easily discharge the air in the radiator shroud 71 while concealing the water pipe of the radiator 61 with the rear shroud 74.

It should be understood that the present invention is not limited to the foregoing embodiment. For example, the opening formed by the rear shroud may of any form, and the water pipe to be concealed by the rear shroud may be any radiator hose.

Examples of the saddle ride-type vehicle include general vehicles in which a rider sits astride a vehicle body, and include not only motorcycles (including motor-assisted bicycles and scooter-type vehicles), but also three-wheeled vehicles (including vehicles having one wheel in front and two in the rear, as well as vehicles having two wheels in front and one in the rear) or four-wheeled vehicles.

It should be also understood that the constitution according to the foregoing embodiment is only illustrative of the present invention, and various changes, such as replacement of the elements in the embodiment by known elements, may be made without departing from the scope of the present invention.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A saddle-ride type vehicle, comprising:
an engine supported on a body frame;
radiators disposed forward of the engine;
a radiator shroud covering a range from a lateral side of each of the radiators to a lateral side of a cylinder head of the engine;
an exhaust port in the radiator shroud, the exhaust port spaced from a rear edge of the radiator shroud and opening outward in a vehicle width direction; and
a partition wall between the radiator and the cylinder head, the partition wall separating a rear space of the radiator and the cylinder head from each other and bringing the rear space into communication with the exhaust port of the radiator shroud and the partition wall extending to the radiator shroud to direct exhaust air from the radiators to the exhaust port.

2. The saddle-ride type vehicle according to claim 1, further comprising:
a radiator fan on a rear surface of the radiator, the downstream side thereof being inclined outward in the vehicle width direction,
wherein the partition wall extends in the vehicle width direction at a rear of the radiator fan.

3. The saddle-ride type vehicle according to claim 2, further comprising:
a fuel tank above the engine;
wherein a rear portion of the fuel tank is formed with knee grip portions, and a front portion of the fuel tank is formed with bulge portions bulging outward in the vehicle width direction, and
wherein the radiator shroud is provided with a pad portion, the pad portion being disposed forward of the bulge portion and protruding more outward in the vehicle width direction than the bulge portion.

4. The saddle-ride type vehicle according to claim 2, further comprising:
a front cowl at a front portion of the vehicle body,
wherein the radiator shroud has a front shroud that extends laterally of the radiator from a side portion of the front cowl, and a rear shroud that is coupled to the rear of the front shroud, and
wherein the rear shroud has an upper portion and a lower portion, the upper portion and the lower portion being coupled to the front shroud, and the exhaust port being formed between the upper portion and the lower portion so as to be spaced from a bottom edge of the radiator shroud.

5. The saddle-ride type vehicle according to claim 4, wherein the rear shroud forms openings around the exhaust port, the openings being surrounded by vertical walls extending vertically and horizontal walls extending longitudinally, and
wherein a water pipe of the radiator is covered with at least the vertical walls or the horizontal walls.

6. The saddle-ride type vehicle according to claim 1, further comprising:
a fuel tank above the engine;
wherein a rear portion of the fuel tank is formed with knee grip portions, and a front portion of the fuel tank is formed with bulge portions bulging outward in the vehicle width direction, and
wherein the radiator shroud is provided with a pad portion, the pad portion being disposed forward of the bulge portion and protruding more outward in the vehicle width direction than the bulge portion.

7. The saddle-ride type vehicle according to claim 6, further comprising:
a front cowl at a front portion of the vehicle body,
wherein the radiator shroud has a front shroud that extends laterally of the radiator from a side portion of the front cowl, and a rear shroud that is coupled to the rear of the front shroud, and
wherein the rear shroud has an upper portion and a lower portion, the upper portion and the lower portion being coupled to the front shroud, and the exhaust port being formed between the upper portion and the lower portion so as to be spaced from a bottom edge of the radiator shroud.

8. The saddle-ride type vehicle according to claim 7, wherein the rear shroud forms openings around the exhaust port, the openings being surrounded by vertical walls extending vertically and horizontal walls extending longitudinally, and
wherein a water pipe of the radiator is covered with at least the vertical walls or the horizontal walls.

9. The saddle-ride type vehicle according to claim 1, further comprising:
a front cowl at a front portion of the vehicle body,
wherein the radiator shroud has a front shroud that extends laterally of the radiator from a side portion of the front cowl, and a rear shroud that is coupled to the rear of the front shroud, and wherein the rear shroud has an upper portion and a lower portion, the upper portion and the lower portion being coupled to the front shroud, and the exhaust port being formed between the upper portion and the lower portion so as to be spaced from a bottom edge of the radiator shroud.

10. The saddle-ride type vehicle according to claim 9, wherein the rear shroud forms openings around the exhaust port, the openings being surrounded by vertical walls extending vertically and horizontal walls extending longitudinally, and wherein a water pipe of the radiator is covered with at least the vertical walls or the horizontal walls.

11. A radiator arrangement in a saddle-ride type vehicle, comprising:
a radiator shroud covering a range from a lateral side of at least one radiator of the saddle-ride type vehicle to a lateral side of a cylinder head of an engine of the saddle-ride type vehicle;
an exhaust port in the radiator shroud, the exhaust port spaced from a rear edge of the radiator shroud and opening outward in a width direction of the saddle-ride type vehicle; and
a partition wall arrangeable between the at least one radiator and the cylinder head, the partition wall separating a rear space of the at least one radiator and the cylinder head from each other and bringing the rear space into communication with the exhaust port of the radiator shroud, the partition wall extending to the radiator shroud.

12. The radiator arrangement in a saddle-ride type vehicle according to claim 11, further comprising:
a radiator fan on a rear surface of the at least one radiator, the downstream side thereof being inclined outward in the vehicle width direction,
wherein the partition wall extends in the vehicle width direction at a rear of the radiator fan.

13. The radiator arrangement in a saddle-ride type vehicle according to claim 12, wherein a rear portion of a fuel tank of the saddle-ride type vehicle is formed with knee grip portions, and a front portion of the fuel tank is formed with bulge portions bulging outward in the vehicle width direction, and
wherein the radiator shroud is provided with a pad portion, the pad portion being disposed forward of the bulge portion and protruding more outward in the vehicle width direction than the bulge portion.

14. The radiator arrangement in a saddle-ride type vehicle according to claim 12, wherein the radiator shroud has a front shroud that extends laterally of the at least one radiator from a side portion of a front cowl of the saddle-ride type vehicle, and a rear shroud that is coupled to the rear of the front shroud, and
wherein the rear shroud has an upper portion and a lower portion, the upper portion and the lower portion being coupled to the front shroud, and the exhaust port being formed between the upper portion and the lower portion so as to be spaced from a bottom edge of the radiator shroud.

15. The radiator arrangement in a saddle-ride type vehicle according to claim 14, wherein the rear shroud forms openings around the exhaust port, the openings being surrounded by vertical walls extending vertically and horizontal walls extending longitudinally, and
wherein a water pipe of the at least one radiator is covered with at least the vertical walls or the horizontal walls.

16. The radiator arrangement in a saddle-ride type vehicle according to claim 11, wherein a rear portion of a fuel tank of the saddle-ride type vehicle is formed with knee grip portions, and a front portion of the fuel tank is formed with bulge portions bulging outward in the vehicle width direction, and
wherein the radiator shroud is provided with a pad portion, the pad portion being disposed forward of the bulge portion and protruding more outward in the vehicle width direction than the bulge portion.

17. The radiator arrangement in a saddle-ride type vehicle according to claim 16, wherein the radiator shroud has a front shroud that extends laterally of the at least one radiator from a side portion of a front cowl of the saddle-ride type vehicle, and a rear shroud that is coupled to the rear of the front shroud, and
wherein the rear shroud has an upper portion and a lower portion, the upper portion and the lower portion being coupled to the front shroud, and the exhaust port being formed between the upper portion and the lower portion so as to be spaced from a bottom edge of the radiator shroud.

18. The radiator arrangement in a saddle-ride type vehicle according to claim 17, wherein the rear shroud forms openings around the exhaust port, the openings being surrounded by vertical walls extending vertically and horizontal walls extending longitudinally, and
wherein a water pipe of the at least one radiator is covered with at least the vertical walls or the horizontal walls.

19. The radiator arrangement in a saddle-ride type vehicle according to claim 11, wherein the radiator shroud has a front shroud that extends laterally of the at least one radiator from a side portion of a front cowl of the saddle-ride type vehicle, and a rear shroud that is coupled to the rear of the front shroud, and
wherein the rear shroud has an upper portion and a lower portion, the upper portion and the lower portion being coupled to the front shroud, and the exhaust port being formed between the upper portion and the lower portion so as to be spaced from a bottom edge of the radiator shroud.

20. The radiator arrangement in a saddle-ride type vehicle according to claim 19, wherein the rear shroud forms openings around the exhaust port, the openings being surrounded by vertical walls extending vertically and horizontal walls extending longitudinally, and
wherein a water pipe of the at least one radiator is covered with at least the vertical walls or the horizontal walls.

* * * * *